(12) United States Patent
Kumar et al.

(10) Patent No.: US 12,430,513 B2
(45) Date of Patent: Sep. 30, 2025

(54) USING MACHINE LEARNING FOR INDIVIDUAL CLASSIFICATION

(71) Applicant: Dell Products L.P., Round Rock, TX (US)

(72) Inventors: Dhilip S. Kumar, Bangalore (IN); Bijan Kumar Mohanty, Austin, TX (US); Hung Dinh, Austin, TX (US); Sujit Kumar Sahoo, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 642 days.

(21) Appl. No.: 17/722,566

(22) Filed: Apr. 18, 2022

(65) Prior Publication Data

US 2023/0334249 A1 Oct. 19, 2023

(51) Int. Cl.
| | |
|---|---|
| G06F 40/30 | (2020.01) |
| G06N 3/044 | (2023.01) |
| G10L 15/16 | (2006.01) |
| G10L 15/18 | (2013.01) |
| G10L 15/22 | (2006.01) |
| G06F 40/35 | (2020.01) |
| G10L 25/30 | (2013.01) |

(52) U.S. Cl.
CPC .......... *G06F 40/30* (2020.01); *G06N 3/044* (2023.01); *G10L 15/16* (2013.01); *G10L 15/1815* (2013.01); *G10L 15/22* (2013.01); *G06F 40/35* (2020.01); *G10L 15/1807* (2013.01); *G10L 15/1822* (2013.01); *G10L 25/30* (2013.01)

(58) Field of Classification Search
None
See application file for complete search history.

(56) References Cited

U.S. PATENT DOCUMENTS

| | | | |
|---|---|---|---|
| 10,311,869 B2 * | 6/2019 | Weng | G10L 13/033 |
| 10,740,704 B2 * | 8/2020 | Vangala | G06Q 30/0641 |
| 10,896,678 B2 * | 1/2021 | Ogawa | G10L 15/05 |
| 10,963,493 B1 * | 3/2021 | Hu | G06N 3/042 |
| 10,997,369 B1 * | 5/2021 | Frazier | G06N 3/045 |
| 11,430,439 B2 * | 8/2022 | Shreeshreemal | G06N 3/044 |
| 11,508,392 B1 * | 11/2022 | Sohail | G10L 15/197 |

(Continued)

FOREIGN PATENT DOCUMENTS

JP 2021124530 A * 8/2021

OTHER PUBLICATIONS

English translation of JP 2021124530 A. (Year: 2021).*

(Continued)

*Primary Examiner* — Richard Z Zhu
(74) *Attorney, Agent, or Firm* — Ryan, Mason & Lewis, LLP

(57) ABSTRACT

A method comprises analyzing a plurality of natural language inputs associated with at least one user, and determining a plurality of contexts for the plurality of natural language inputs based, at least in part, on the analysis. In the method, a plurality of relationships linked to the at least one user are identified based, at least in part, on the analysis, and the at least one user is classified in one or more categories based, at least in part, on the plurality of contexts and the plurality of relationships. At least one of the analyzing, determining, identifying and classifying is performed using one or more machine learning models.

20 Claims, 14 Drawing Sheets

(56) References Cited

U.S. PATENT DOCUMENTS

| | | | |
|---|---|---|---|
| 11,694,686 B2* | 7/2023 | Mohanty | G06N 3/08 |
| | | | 704/235 |
| 2018/0032507 A1* | 2/2018 | Mikhaylov | G06F 40/30 |
| 2018/0358005 A1* | 12/2018 | Tomar | G06F 40/30 |
| 2019/0364009 A1* | 11/2019 | Joseph | G06N 5/04 |
| 2020/0073933 A1* | 3/2020 | Zhao | G06F 40/117 |
| 2020/0167966 A1* | 5/2020 | Kim | G06N 20/10 |
| 2020/0357382 A1* | 11/2020 | Ogawa | G06N 3/02 |
| 2021/0056968 A1* | 2/2021 | Shreeshreemal | G06F 3/167 |
| 2021/0264216 A1* | 8/2021 | Liu | G06N 3/08 |
| 2021/0391080 A1* | 12/2021 | Fan | G06F 40/30 |
| 2022/0310083 A1* | 9/2022 | Mohanty | G06N 5/02 |
| 2022/0321967 A1* | 10/2022 | Olabode | G06N 5/04 |
| 2022/0343145 A1* | 10/2022 | Xue | G06F 17/16 |
| 2023/0134101 A1* | 5/2023 | Chen | G06F 40/284 |
| | | | 704/9 |
| 2023/0138741 A1* | 5/2023 | Patel | G10L 15/22 |
| | | | 704/235 |
| 2023/0186120 A1* | 6/2023 | Zhao | G06N 5/022 |
| | | | 706/45 |

OTHER PUBLICATIONS

Wikipedia, "Psychometrics," https://en.wikipedia.org/w/index.php?title=Psychometrics&oldid=1077311341, Mar. 15, 2022, 12 pages.

K. Godfrey Maddocks, "What is Psychometrics? How Assessments Help Make Hiring Decisions," https://www.snhu.edu/about-us/newsroom/social-sciences/what-is-psychometrics, Nov. 14, 2019, 9 pages.

Wikipedia, "Natural Language," https://en.wikipedia.org/w/index.php?title=Natural_language&oldid=977532848, Sep. 9, 2020, 3 pages.

Wikipedia, "Natural-language Generation," https://en.wikipedia.org/w/index.php?title=Natural-language_generation&oldid=983323430, Oct. 13, 2020, 7 pages.

Wikipedia, "Chatbot," https://en.wikipedia.org/w/index.php?title=Chatbot&oldid=982264678, Oct. 7, 2020, 12 pages.

U.S. Appl. No. 17/209,372 filed in the name of Bijan Kumar Mohanty et al. Mar. 23, 2021, and entitled "Virtual Assistant Response Generation."

* cited by examiner

```
First Conv1D layer:
conv = Conv1D(8,13, padding='valid', activation='relu', strides=1)(inputs)
conv = MaxPooling1D(3)(conv)
conv = Dropout(0.3)(conv)

Second Conv1D layer:
conv = Conv1D(16, 11, padding='valid', activation='relu', strides=1)(conv)
conv = MaxPooling1D(3)(conv)
conv = Dropout(0.3)(conv)

Third Conv1D layer:
conv = Conv1D(32, 9, padding='valid', activation='relu', strides=1)(conv)
conv = MaxPooling1D(3)(conv)
conv = Dropout(0.3)(conv)

Fourth Conv1D layer:
conv = Conv1D(64, 7, padding='valid', activation='relu', strides=1)(conv)
conv = MaxPooling1D(3)(conv)
conv = Dropout(0.3)(conv)

Flatten layer:
conv = Flatten()(conv)

Dense layer 1:
conv = Dense(256, activation='relu')(conv)
conv = Dropout(0.3)(conv)

Dense layer 2:
conv = Dense(128, activation='relu')(conv)
conv = Dropout(0.3)(conv)

outputs = Dense(len(labels), activation='softmax')(conv)
```

FIG. 5

```
In [ ]: import numpy as np
import pandas as pd
from nltk.corpus import stopwords
from nltk.tokenize import word_tokenize
from nltk.stem.lancaster import LancasterStemmer
import nltk
import re
from sklearn.preprocessing import OneHotEncoder
import matplotlib.pyplot as plt
from keras.preprocessing.text import Tokenizer
from keras.preprocessing.sequence import pad_sequences
from keras.utils import to_categorical
from keras.models import Sequential, load_model
from keras.layers import Dense, LSTM, Bidirectional, Embedding, Dropout
from keras.callbacks import ModelCheckpoint def load_dataset(filename):
    df = pd.read_csv(filename, encoding = "latin1", names = ["Sentence", "Intent"])
    print(df.head())
    intent = df["Intent"]
    unique_intent = list(set(intent))
    sentences = list(df["Sentence"])

return (intent, unique_intent, sentences)

intent, unique_intent, sentences = load_dataset("IntentClassification_data.csv")
print(sentences[:5])
```

FIG. 7

USING MACHINE LEARNING FOR INDIVIDUAL CLASSIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to using machine learning (ML) to classify individuals based on one or more features.

BACKGROUND

Psychometrics refers to psychological assessments to objectively measure latent characteristics such as, for example, intelligence, introversion, abilities, attitudes and personality traits. Current approaches rely on instruments such as, for example, questionnaires, surveys and tests, to collect data and provide quantitative measures of the latent characteristics of individuals.

Psychometric assessment tools can be used in, for example, career guidance and employment scenarios to determine a prospective or current employee's abilities. Existing psychometric assessment tools are generic. For example, a set of questions may be provided to individuals to determine their abilities or other characteristics based on the answers they choose.

SUMMARY

Illustrative embodiments provide techniques to use machine learning to develop individual profiles based on personalized data of each individual.

In one embodiment, a method comprises analyzing a plurality of natural language inputs associated with at least one user, and determining a plurality of contexts for the plurality of natural language inputs based, at least in part, on the analysis. In the method, a plurality of relationships linked to the at least one user are identified based, at least in part, on the analysis, and the at least one user is classified in one or more categories based, at least in part, on the plurality of contexts and the plurality of relationships. At least one of the analyzing, determining, identifying and classifying is performed using one or more machine learning models.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts example pseudocode for speech-to-text conversion according to an illustrative embodiment.

FIG. 7 depicts example pseudocode for intent analysis and classification according to an illustrative embodiment.

DETAILED DESCRIPTION

Figure 1:
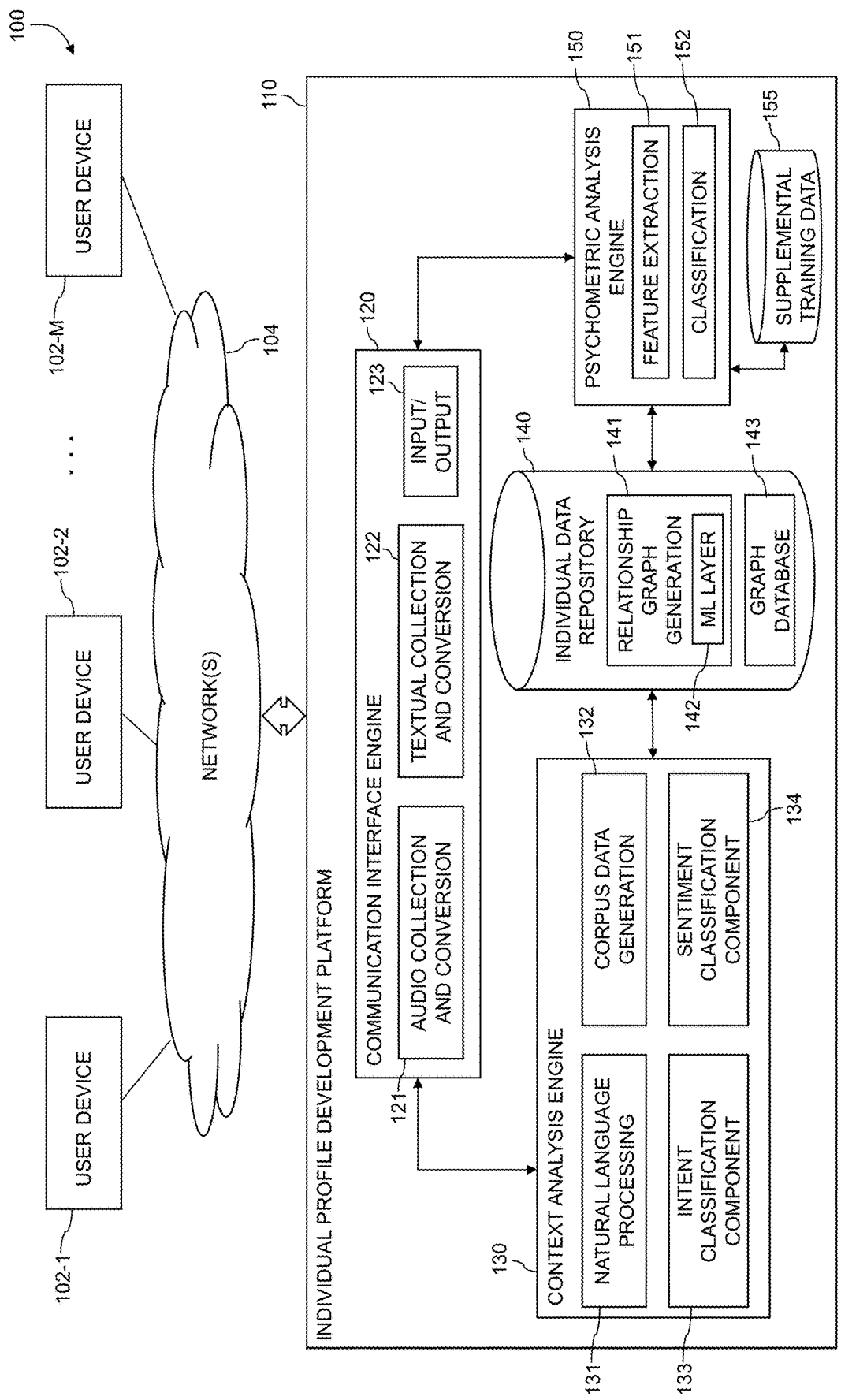
FIG. 1 depicts details of an information processing system with an individual profile development platform for classifying individuals based on one or more features according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training machine learning models using a corpus of human-written texts.

As used herein, "psychometric class" and/or "psychometric classification" are to be broadly construed to refer to the placement of individuals into categories based on characteristics such as, but not necessarily limited to, intelligence, introversion, extroversion, abilities (e.g., conversational, communication, writing, organization, leadership, physical and other abilities), attitudes (e.g., positive, negative, neutral), goals, satisfaction, loyalty, interests and other personality traits. For example, an individual may be classified as having certain types and/or relative levels of intelligence, introversion, extroversion, abilities, attitudes, goals, satisfaction, loyalty, interests and other personality traits.

In illustrative embodiments, machine learning techniques are used to provide technical solutions that address technical problems with current psychometric assessment tools. For example, the embodiments provide technical solutions which classify specific users based on user trends and behavior learned over a period of time using one or more machine learning models. Advantageously, the embodiments provide intelligent psychometric assessment techniques that accumulate users' domain expertise based on, for example, the users' conversations, meetings and the people with which the users communicate. The embodiments maintain and manage user data to classify users based on psychometric characteristics, and to recommend personalized training and/or further assessments based on the classifications. The embodiments use one or more machine learning techniques to provide domain and user-specific psychometric assessments based on continuously learned expertise tied to a user's behavior and decision-making over time.

FIG. 1 shows an information processing system 100 configured in accordance with an illustrative embodiment. The information processing system 100 comprises user devices 102-1, 102-2, ... 102-M (collectively "user devices 102"). The user devices 102 communicate over a network 104 with an individual profile development platform 110.

The user devices 102 can comprise, for example, Internet of Things (IoT) devices, desktop, laptop or tablet computers, mobile telephones, or other types of processing devices capable of communicating with the individual profile development platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K and L are assumed to be arbitrary positive integers greater than or equal to one.

The terms "client," "customer" or "user" herein are intended to be broadly construed so as to encompass numerous arrangements of human, hardware, software or firmware entities, as well as combinations of such entities. Individual profile development services may be provided for users utilizing one or more machine learning models, although it is to be appreciated that other types of infrastructure arrangements could be used. At least a portion of the available services and functionalities provided by the individual profile development platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the individual profile development platform 110, as well as to support communication between the individual profile development platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the individual profile development platform 110.

The individual profile development platform 110 in the present embodiment is assumed to be accessible to the user devices 102, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The individual profile development platform 110, on behalf of respective infrastructure tenants each corresponding to one or more users associated with respective ones of the user devices 102, provides a platform for classifying individuals based on one or more features.

Referring to FIG. 1, the individual profile development platform 110 comprises a communication interface engine 120, a context analysis engine 130, an individual data repository 140, a psychometric analysis engine 150 and a supplemental training data database 155. The communication interface engine 120 comprises an audio collection and conversion component 121, a textual collection and conversion component 122 and an input/output component 123. The context analysis engine 130 comprises a natural language processing (NLP) component 131, a corpus data generation component 132, an intent classification component 133 and a sentiment classification component 134. The individual data repository 140 comprises a relationship graph generation component 141 comprising a machine learning (ML) layer 142, and a graph database 143. The psychometric analysis engine 150 comprises a feature extraction component 151 and a classification component 152.

Figure 2:
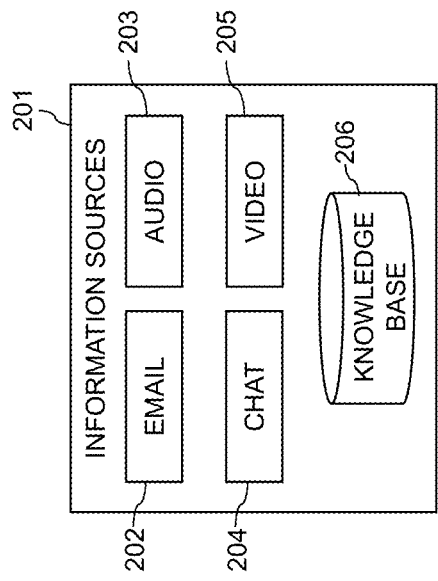
FIG. 2 depicts example information sources for natural language inputs to the individual profile development platform according to an illustrative embodiment.

The communication interface engine 120 receives communications in textual and audio formats from, for example, information sources 201 shown in FIG. 2. In a non-limiting illustrative embodiment, the information sources 201 comprise, for example, email 202, audio sources 203, chat sources 204, video sources 205 and/or data from a knowledge base 206. The audio sources 203 include, but are not necessarily limited to, voice messages (e.g., voicemail messages), and/or audio from meetings, presentations, conferences, recorded conversations, etc. The video sources 205 include, but are not necessarily limited to, video from meetings, presentations, conferences, etc. The knowledge base 206 may include data in the form of, for example, articles, papers, guidelines, policies, regulations, etc. that may affect user actions and decision-making, especially when affiliated with a business or other enterprise. The communication interface engine 120 provides an interface layer for communications with external systems and devices. Inbound or outbound communications involving multiple types of messages such as, for example, email, voice and chat messages, pass through the communication interface engine 120 before and after being processed by the individual profile development platform 110.

The audio collection and conversion component 121 uses speech-to-text techniques to convert received audio communications into textual data. The textual data is input to and analyzed by the context analysis engine 130. The textual collection and conversion component 122 receives textual input from, for example, email 202, chat sources 204 and/or data from a knowledge base 206 and provides the textual data to the context analysis engine 130. In some embodiments, the textual collection and conversion component 122 receives textual input from the psychometric analysis engine 150 (e.g., psychometric classifications, personalized training recommendations and/or further assessment recommendations) and, when necessary, using text-to-speech and/or NLG techniques, converts the textual input into audio to be distributed to one or more users via user devices 102 configured to interact with users using speech or other types of audio interfaces. The input/output component 123 provides interfaces for user devices 102 to access the individual profile development platform 110 and for user devices 102 to receive outputs from the individual profile development platform 110. The input/output component 123 receives and processes incoming inputs from users (e.g., via user devices 102). The inputs comprise, for example, requests for psychometric classifications, requests for personalized training recommendations and/or individual assessment recommendations, statements, queries, requests for services (e.g., human resources (HR) requests), requests for documents, requests for help/support, requests for information, requests for status, audio transcripts and/or audio files, video transcripts and/or video files, chat transcripts and/or files, emails and other types of natural language inputs. The natural language inputs may come from any of the information sources 201 described herein. The input/output component 123 further receives and processes outgoing responses to user devices 102. The responses comprise, for example, natural language responses and/or recommendations in response to one or more natural language inputs. The input/output component 123 may format outputs from the psychometric analysis engine 150 to be displayed and/or transmitted via one or more channels on different types of interfaces (e.g., mobile, webpage, email, chat, audio, video, etc.). The input/output component 123 comprises one or more application programming interfaces (APIs) to interface with the channels, different elements of the individual profile development platform 110 and/or the user devices 102. The input/output component 123 facilitates interactions between devices of multiple types (e.g., physical, virtual, mobile, desktop) through multiple mediums (e.g., web, cellular, satellite, etc.). For example, the input/output component 123 standardizes communications, and formats responses and/or recommendations based on different interface types.

Figure 4:
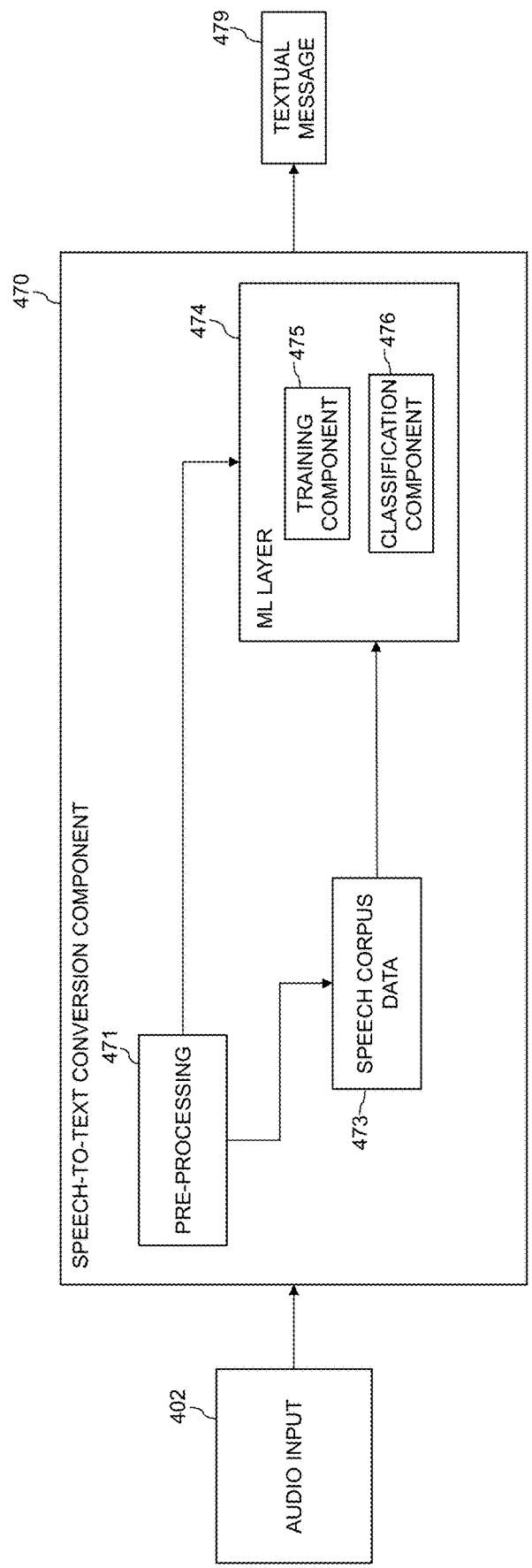
FIG. 4 depicts details of an operational flow for speech-to-text conversion according to an illustrative embodiment.

Referring to FIGS. 1 and 4, the audio collection and conversion component 121 of the communication interface engine 120 includes a speech-to-text conversion component 470, which converts audio input 402 (e.g., natural language input received as audio signals) to text (e.g., textual message 479) before being analyzed for intent, sentiment, and other context. The speech-to-text conversion component 470 extracts features from an audio signal (e.g., voice input), which are input to a machine learning model of the ML layer 474.

The audio input 402 may be received in digital signal format. If the audio signals are in analog format, the signals can be converted into a digital format using, for example, the pre-processing component 471, which performs conversion based on a sampling rate or sampling frequency, which corresponds to the number of samples selected per second. The pre-processing component 471 extracts features from an audio signal, which are input to the ML layer 474. In order to perform feature extraction, the pre-processing component may perform time domain analysis and frequency domain analysis. In time domain analysis, the audio signal is represented by amplitude as a function of time (e.g., a plot of amplitude versus time). In frequency domain analysis, the audio signal is represented by frequency as a function of amplitude (e.g., a plot of frequency versus amplitude). To represent features between frequency and time, a spectrogram is plotted.

In connection with feature extraction, the speech-to-text conversion component 470 utilizes TensorFlow, which provides a speech commands dataset that includes one-second-long utterances of many words made by thousands of people. This data set makes up at least part of the speech corpus data 473, which is input to the training component 475 of the ML layer 474 and used as training data for the speech-to-text machine learning model. For example, LibROSA and SciPy libraries can be used for audio processing in Python.

Figure 3:
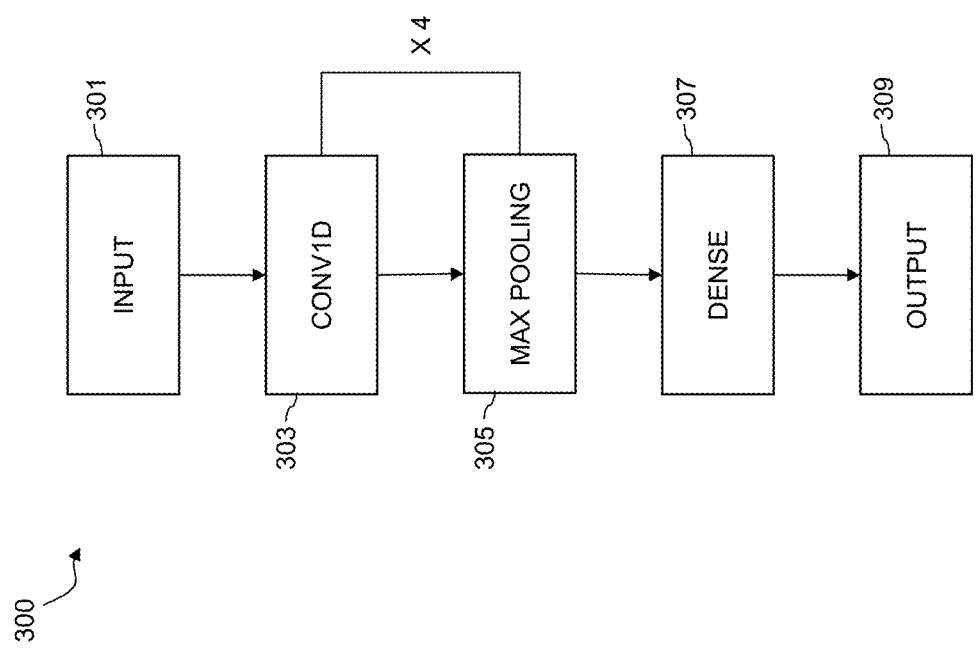
FIG. 3 depicts details of a speech-to-text model according to an illustrative embodiment.

The classification component 476 utilizes a neural network for feature learning and prediction of text (e.g., textual message 479) from received audio input 402. For example, referring to FIG. 3, in connection with an audio input 301, a speech-to-text model 300 uses a one-dimension convolutional neural network (CNN) referred to as Conv1d 303, which may be implemented in TensorFlow and/or Keras. In this model 300, there are four layers (×4) of Conv1d 303, and a max pooling layer 305 is used.

As noted above an audio signal from an input 301 or 402 is pre-processed by the pre-processing component 471 using sampling (if needed) and by removing speech spanning less than a given time period (e.g., 1 second). For a multi-classification use case, target value labels, which comprise categorical data, are encoded. Encoding may be performed using a LabelEncoder, which is a class available in a ScikitLearn library. Audio sample data is divided into training and test sets. In a non-limiting example, 80% of the audio sample data is training data and 20% of the data is test data. The training component 475 trains the machine learning model with the training data set (speech corpus data 473). The classification component 476 utilizes four convolutional layers (Conv1d 303 in FIG. 3) that use a rectifier linear unit (ReLu) function as the activation function. A dense layer 307 is connected to the max pooling layer 305, and can perform, for example, matrix-vector multiplication. The output layer 309 uses, for example, Softmax, as the activation function. Categorical cross-entropy is used as the loss function (error or the difference between the predicted value and actual value) and an Adam optimizer is used by the machine learning model. FIG. 5 depicts example pseudo-code 500 for speech-to-text conversion using Keras, TensorFlow backend, and LibROSA and SciPy libraries.

The context analysis engine 130 analyzes the context of a communication. The context analysis engine uses the natural language processing (NLP) component 131 to perform NLP comprising, for example, grammar cloning, grammar pruning, rules filtering, searching, restriction identification, restriction filtering and other processing to understand the communication context. As described further herein, the intent and sentiment classification components 133 and 134 are used to determine intent and sentiment of a communication.

The corpus data generation component 132 gathers and organizes words, phrases, intent and sentiment associated with dialog (e.g., sentence, message or other communication) of a user in connection with one or more subject areas (also referred to herein as "domains"). The corpus data generation component 132 provides these details to the individual data repository 140, which receives and processes information specific to users in the context of a given domain(s). The individual data repository 140 comprises a relationship graph generation component 141, which includes an ML layer 142 that uses one or more machine learning techniques to build relationship graphs corresponding to interactions between users and other persons, actions taken by the users and other persons and the domains in which the interactions and actions are taking place. The input from the corpus data generation component 132 is used as training data for the ML layer 142 of the relationship graph generation component 141. The individual data repository 140 stores the relationship graphs in a graph database 143 to provide a knowledge base of expertise for a plurality of users in given domains. The input from the corpus data generation component 132 is also used as training data for ML layers of the intent and sentiment classification components (see FIGS. 6 and 8, elements 664 and 864).

Figure 6:
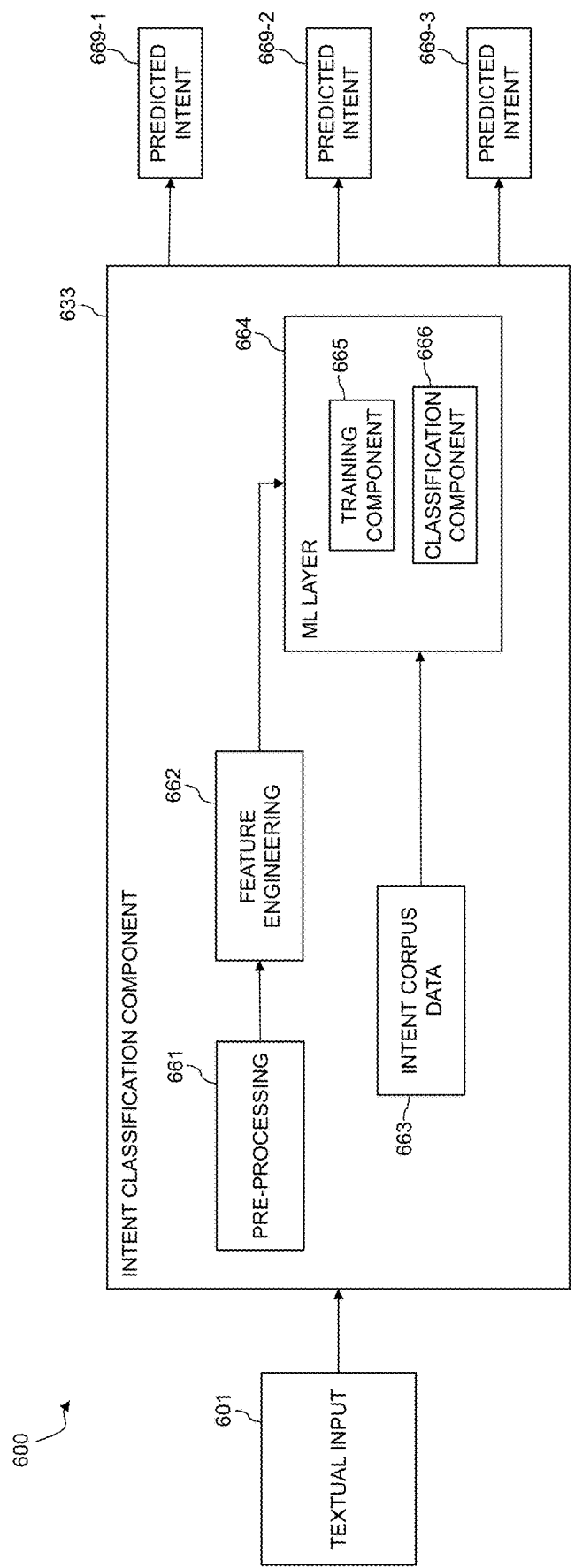
FIG. 6 depicts details of an operational flow for intent classification according to an illustrative embodiment.

Referring to FIGS. 1 and 6, the intent classification component 133/633 uses NLU and neural networks to analyze messages and classify intent. The embodiments base a dialog where the words come one after another over a period of time, on a time series model, and leverage a Recurrent Neural Network (RNN). In order to efficiently analyze a message, the embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for the NLU.

The machine learning model used by the ML layer 664 is a bi-directional with LSTM model. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states. In addition, LSTM utilized by the embodiments introduces advanced memory units and gates to an RNN to improve accuracy and performance of the machine learning model.

Referring to the operational flow 600 in FIG. 6, intent analysis by the intent classification component 633 (e.g., which is the same or similar to the intent classification component 133) uses intent corpus data 663 to train the machine learning model. This corpus data contains words and/or phrases and the corresponding intent associated with each of the words and/or phrases provided by the corpus data generation component 132. The training data is input to the training component 665 of the ML layer 664 to train the machine learning model.

Referring to FIG. 6, according to an embodiment, a pre-processing component 661 cleans any unwanted characters and stop words from the corpus data. The pre-processing further comprises stemming and lemmatization, as well as changing text to lower case, removing punctuation, and removing incorrect or unnecessary characters. Once pre-processing and data cleanup is performed, the feature engineering component 662 tokenizes the input list of words in the sentences and/or phrases. Tokenization can be performed using, for example, a Keras library or a natural language toolkit (NLTK) library. A Keras tokenizer class can be used to index the tokens. After tokenization is performed, the resulting words are padded to make the words have equal lengths so that the words can be used in the machine learning model. A list of intents is indexed and fed into the machine model for training. The intents may be one-hot encoded before being input to the model. Some features and/or parameters used in connection with the creation of the bi-directional RNN with LSTM model include an Adam optimizer, Softmax activation function, batch size and a number of epochs. These parameters or features are tuned to get the best performance and accuracy of the model. After the model is trained with the intent corpus data 663, the model is used to predict the intent for incoming textual input 601 (e.g., natural language input) including, for example, dialogs and/or messages. The accuracy of the model is calculated for hyperparameter tuning.

Referring to the operational flow 600 for intent classification in FIG. 6, the textual input 601 (e.g., a natural language input) is pre-processed and engineered by the pre-processing and feature engineering components 661 and 662, and then input to the ML layer 664 so that intent can be classified by the classification component 666 using the trained machine learning model to generate predicted intents 669-1, 669-2 and 669-3. While three predicted intents are shown, more or less predicted intents can be generated. Some example predicted intents include, for example, project completion or performance, promotion, human resources referral, education and training.

FIG. 7 depicts example pseudocode 700 for intent analysis and classification according to an illustrative embodiment. For the implementation of the intent classification component 133/633, Python language and NumPy, Pandas, Keras and NLTK libraries can be used.

Figure 8:
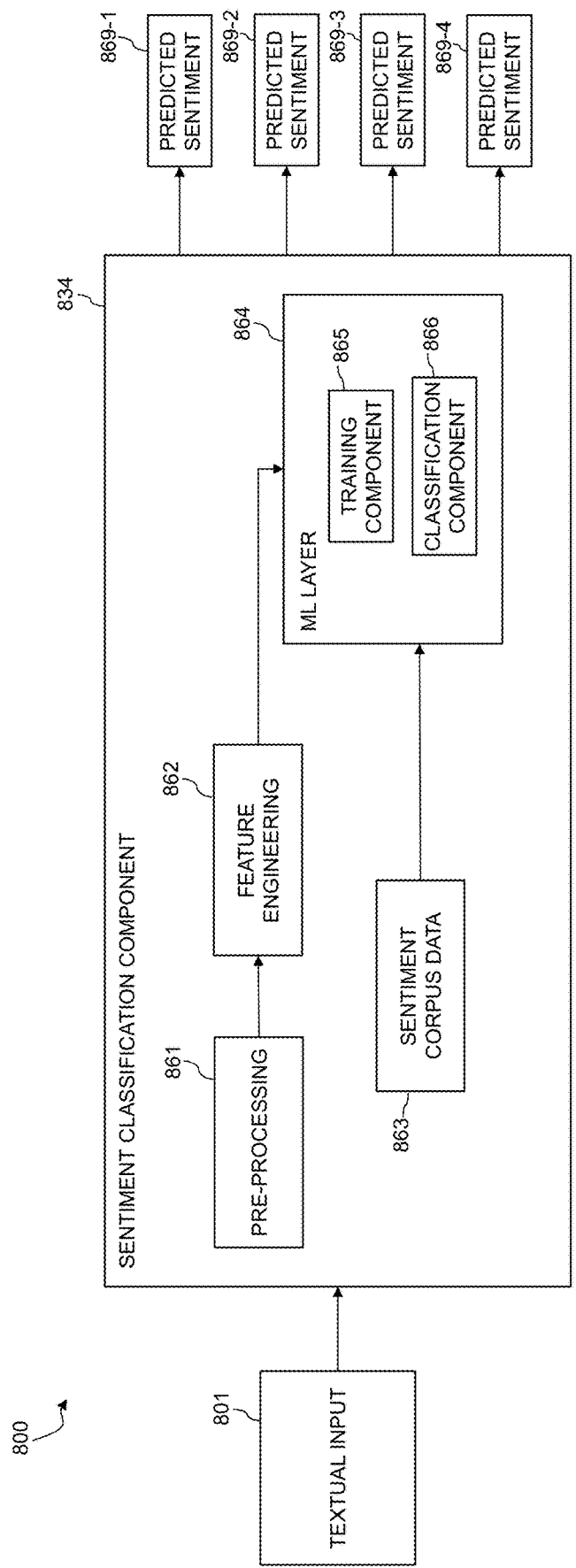
FIG. 8 depicts details of an operational flow for sentiment analysis and classification according to an illustrative embodiment.

Referring to FIGS. 1 and 8, the sentiment classification component 134/834 uses NLU to analyze messages and predict the sentiment of a dialog. Sentiment analysis assists with understanding message context and making appropriate decisions in a priority manner. In some embodiments, the psychometric analysis engine 150 will make psychometric classifications and/or generate recommended actions for a person based at least in part on the sentiment of messages from, for example, emails, text messaging via, for example, short message service (SMS) and/or voicemails. The sentiment classification component 134/834 follows the same or similar patterns and algorithms as the intent classification component 133/633. Instead of intent corpus data, the sentiment classification component 134/834 uses sentiment corpus data 863 and follows the same or similar steps including data pre-processing with a pre-processing component 861 and feature engineering with a feature engineering component 862, before training a bi-directional RNN with LSTM model for predicting sentiment. Similar to the intent classification component 133/633, the sentiment classification component 134/834 includes an ML layer 864 with training and classification components 865 and 866.

Referring to the operational flow 800 in FIG. 8, sentiment analysis by the sentiment classification component 834 (e.g., which is the same or similar to the sentiment classification component 134) uses sentiment corpus data 863 to train the machine learning model. This corpus data contains words and/or phrases and the corresponding sentiment associated with each of the words and/or phrases provided by the corpus data generation component 132. For example, sentiment refers to how a natural language input can be characterized in terms of tone or a nature of the input (e.g., positive, negative, neutral, anxious, concerned, etc.). A priority of an input or request can be determined based on sentiment. For example, a negative, anxious or concerned sentiment may lead to an urgent or high priority, while a neutral or positive sentiment may lead to a normal, mid-level or low priority. The training data is input to the training component 865 of the ML layer 864 to train the machine learning model.

Referring to the operational flow 800 for sentiment classification in FIG. 8, the textual input 801 (e.g., a natural language input) is pre-processed and engineered by the pre-processing and feature engineering components 861 and 862, and then input to the ML layer 864 so that sentiment can be classified (e.g., by the classification component 866) using the trained machine learning model to generate predicted sentiments 869-1, 869-2, 869-3 and 869-4. While four predicted sentiments are shown, more or less predicted sentiments can be generated. Some example predicted sentiments include, for example, anxious, positive, neutral and negative.

Figure 9:
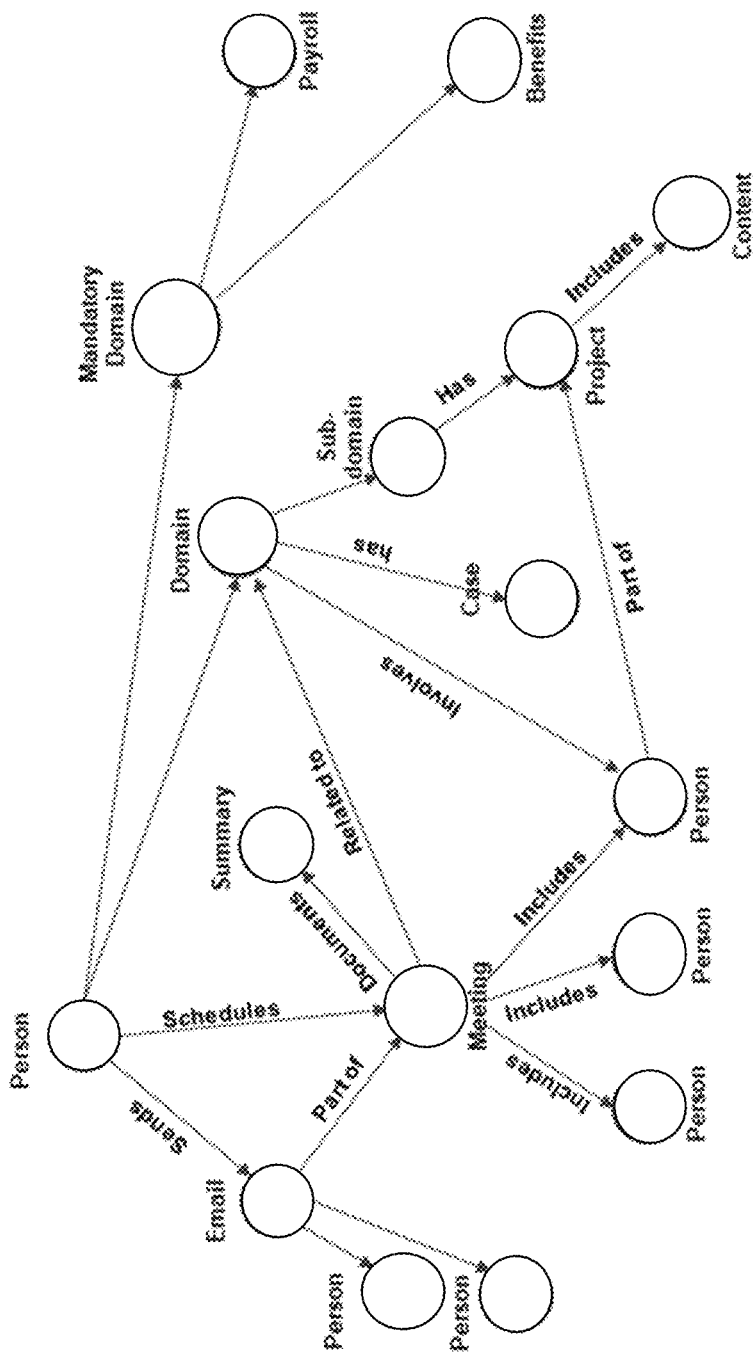
FIG. 9 depicts an example relationship graph according to an illustrative embodiment.

As can be seen in the example relationship graph 900 in FIG. 9, the embodiments identify relationships and concepts from the daily conversations, decisions, and actions of a plurality of people. The relationship graph generation component 141 generates graphs capturing the identified relationships and concepts for the plurality of people so that the psychometric analysis engine 150 can retrieve and utilize information specific to a given user (e.g., person) to classify a given user and recommend actions tailored for the given user. Referring to the graph 900, concepts such as, for example, cases/incidents, projects, payroll and benefits, are created by the relationship graph generation component 141 based on the daily activities and interactions of a person who works with a number of enterprise domains (e.g., in this case, support and human resources domains). The relationships between nodes of the graph are illustrated by lines (also referred to herein as "edges"). As shown in the graph 900, the nodes comprise, for example, users/persons, domains, sub-domains, functions (e.g., payroll, benefits), utilities (e.g., email), activities or tasks (e.g., meetings, projects, cases) and information (e.g., content, summaries). The relationships that connect the nodes depend on the interactions between the nodes, and may include identifiers such as, for example, "schedules" and "attends" in the case of meetings or "sends" and "receives" in the case of email, and may involve multiple users/persons based on their involvement with each node. Other identifiers comprise, but are not necessarily limited to, "part of," "includes," "involves," "has," "documents" and/or "related to."

Figure 10B:
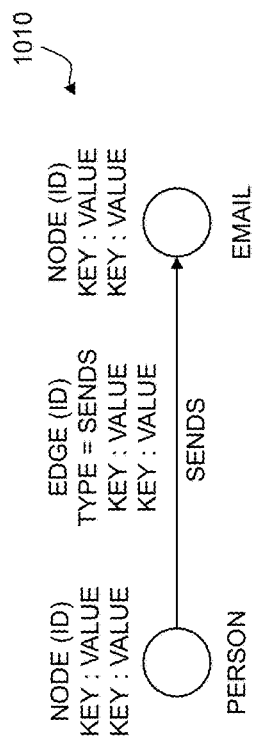
FIG. 10B depicts an example of a labeled property graph (LPG) format for a relationship graph according to an illustrative embodiment.
Figure 10A:
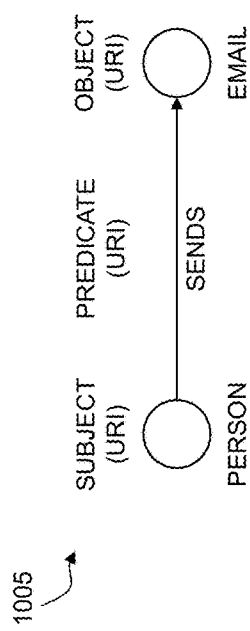
FIG. 10A depicts an example of a resource description framework (RDF) format for a relationship graph according to an illustrative embodiment.

Referring to FIGS. 10A and 10B, examples of a resource description framework (RDF) format 1005 and a labeled property graph (LPG) format 1010 for a relationship graph are shown. In accordance with embodiments, the RDF format or the LPG format can be used for storing information on and retrieving information from relationship graphs. The examples of the RDF and LPG formats are explained in terms of a person sending an email, but the embodiments are not limited thereto.

The RDF format 1005 structures information (e.g., entities and relationship) as a triple comprising a subject, predicate and object. For example, a person who sends an email is stored as a subject (person), the predicate is the relationship (e.g., sends) and the object is the other entity (e.g., email). As can be seen, the subject is a node/entity in the graph. The predicate is an edge (e.g., relationship between nodes), and the object is another node. These nodes and edges are identified by unique identifiers (URIs), which are used to label the nodes and edges.

With the LPG format 1010, each entity is represented as a node with a uniquely identifiable ID and a set of key-value pairs corresponding to properties that characterize the entity (e.g., in this case key-value pairs that identify the person and the utility (email)). The relationship between two entities comprises an edge, which is a connection between the nodes. Relationships are uniquely identified by a uniquely identifiable ID and a type (e.g., sends). Relationships are also represented by a set of key-value pairs corresponding to properties that characterize the connections. While two key-value pairs are shown as corresponding to each entity and relationship, the embodiments are not necessarily limited thereto, and more or less than two key-value pairs may be used to identify and characterize the nodes and edges.

According to one or more embodiments, the individual data repository 140 stores relationship graphs in the graph database 143 and provides relationship data from the relationship graphs in response to queries or other inputs. The graphical format permits data analysis and traversal at multiple levels in real-time and enables the real-time addition of new context and connections. Advantageously, the graph-based individual data repository 140 provides a foundation for maintaining data of an enterprise, which accelerates the growth and sustenance of long-term knowledge. The individual data repository 140 is capable of being enriched with raw and derived data over time, resulting in graphs that include increasing levels of details, context, truth, intelligence, and semantics. The graphical format is more indicative of a user's real-world ecosystem and domain than other representations of data, and provides a more efficient mechanism for search and retrieval of information than other approaches. Data can be retrieved from the individual data repository using a variety of query languages capable of traversing graphs such as, but not necessarily limited to, formats including structured query language (SQL) and SPARQL.

Figure 11:
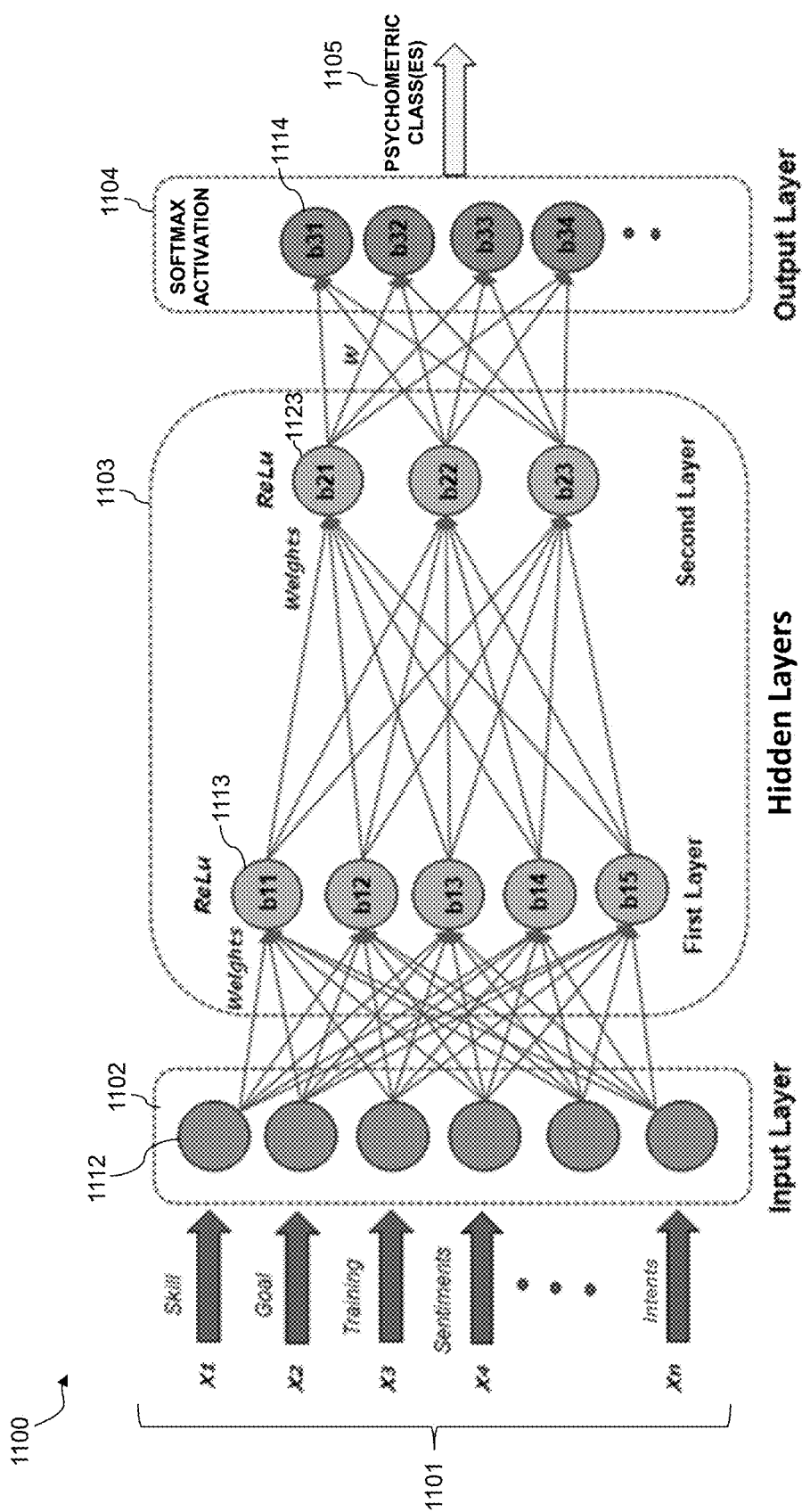
FIG. 11 depicts an architecture of a neural network used for individual classification according to an illustrative embodiment.

Referring to FIGS. 1 and 11, the psychometric analysis engine 150 includes a classification component 152, which classifies users in one or more categories based, at least in part, on contexts (e.g., intent and sentiment) determined by the context analysis engine 130 and relationships from the individual data repository 140 identified by the relationship graph generation component 141. As explained herein, the one or more categories comprise, for example, psychometric classes. In illustrative embodiments, the feature extraction component 151 extracts a plurality of features from the contexts determined by the context analysis engine 130 and from one or more relationship graphs like the graph 900 shown in FIG. 9. Referring to FIG. 11, the extracted features 1101 are input to an input layer 1102 of neural network 1100 comprising at least two hidden layers 1103 (e.g., first and second layers) and an output layer 1104. The neural network 1100 is an element of the classification component 152, which predicts the one or more psychometric classes 1105 for a given individual (e.g., user). The extracted features 1101 include, but are not necessarily limited to, one or more skills, interests and goals of a user, previous training that a user has undergone, sentiments and intents of natural language inputs associated with a user, meetings or other events that a user has attended, and people, departments and/or domains with or in which a user works.

According to one or more embodiments, the contexts and relationships used in the classification analysis by the classification component 152 are stored in and retrieved from the individual data repository 140. The classification component 152 leverages a supervised learning mechanism and trains the neural network 1100 with training context and relationship data from the individual data repository 140, and with supplemental training data from the supplemental training data database 155. The supplemental training data comprises, for example, user human resources data. The human resource data can include, for example, data identifying users (e.g., names, user ids, addresses, etc.), positions of users within an enterprise, education of users, promotion history, salary and/or results of previous user evaluations and/or surveys. During the training, the features noted herein above (e.g., extracted features 1101) are input to the neural network (or other machine learning model) as independent variables with psychometric classes in the dataset as dependent (e.g., target values). Once trained the machine learning model predicts the psychometric classes of users based on features corresponding to those users. As contexts and relationships change over time, depending upon, for example, behavioral changes of a user as documented in the individual data repository 140, a user's psychometric profile can change.

Referring to FIG. 11, the neural network 1100 comprises, for example, a deep neural network comprising an input layer 1102, one or more hidden layers 1103 and an output layer 1104. Input layer 1102 comprises a plurality of neurons 1112 (nodes) that matches the number of input independent variables (e.g., features). Hidden layers 1103 comprise first and second layers. The number of neurons 1113 and 1123 in each of the first and second layers depend on the number of neurons 1112 in the input layer 1102. As the machine learning model is a multi-class classification model, the output layer 1104 includes the same number of neurons 1114 as the number of psychometric classes.

Although there are five neurons/nodes 1113 shown in the first layer of the hidden layers 1103 and three neurons/nodes 1123 shown in the second layer of the hidden layers 1103, the actual number of neurons 1113 and 1123 depend on the total number of neurons 1112 in the input layer 1102. For example, the number of neurons 1113 in the first layer is calculated based on an algorithm matching the power of 2 to the number of input neurons 1112. For example, in a non-limiting illustrative example, if the number of input variables is 19, the number of neurons in the first layer of the hidden layers 1103 is $2^5$, which is equal to 32. $2^4$, which is equal to 16, is too small (e.g., less than 19). As a result, the first layer of the hidden layers 1103 will have $2^5=32$ neurons, and the second layer of the hidden layers 1103 will include $2^4=16$ neurons. If there were a third hidden layer, it would include $2^3=8$ neurons. The embodiments are not necessarily limited to basing the number of neurons 1113 and 1123 in the hidden layers 1103 on the number neurons 1112 in the input layer 1102, and other methods to determine the number of neurons 1113 and 1123 may be used.

According to illustrative embodiments, the neurons 1113 and 1123 in the hidden layers 1103 and the neurons 1114 in the output layer 1104 utilize an activation function which determines whether the neuron will fire or not fire. For example, rectified linear unit (ReLu) activation function is used for the neurons 1113 and 1123 in both the first and second ones of the hidden layers 1103. The neurons 1114 in the output layer utilize a Softmax activation function. The embodiments are not necessarily limited to the ReLu and Softmax activation functions.

In the illustrative embodiment of FIG. 11, each of the neurons 1112 connects with each of the neurons 1113, each of the neurons 1113 connects with each of the neurons 1123 and each of the neurons 1123 connects with each of the neurons 1114. Each connection has a weight factor and each of the neurons 1113, 1123 and 1114 has a bias factor. In an illustrative embodiment, the weight and bias values may be randomly set by the neural network 1100, and may start at values of 1 or 0. In illustrative embodiments, each neuron 1113 computes a weighted sum (WS) by adding the products of each input variable (X1, X2, X3, X4, ..., Xn) with their weight factors and then adding the bias of the neuron 1113. The formula for this calculation is shown as equation (1) below.

$$WSz=(X1)(W1z)+(X2)(W2z)+(X3)(W3z)+(X4)(W4z), \ldots, (Xn)(Wnz)+b1z \quad (1)$$

where WSz is the weighted sum of neuron Z, where Z is from 1 (for the 1$^{st}$ neuron 1113) to the number of neurons 1113 in the first layer of the hidden layers 1103. X1, X2, etc. are the input values to the model and W1z, W2z, etc. are the weight values applied to the connections to the neuron Z from the input neurons 1112 and b1z is the bias value of neuron Z. This weighted sum WSz is input to an activation function (e.g., in this case ReLu) to compute the value of the activation function for each neuron 1113. The weighted sum values of all neurons 1113 in the first layer are calculated in accordance with equation (1).

In illustrative embodiments, each neuron 1123 computes a next weighted sum (NWS) by adding the products of each weighted sum from the neurons 1113 (WS1, WS2, WS3, WS4, ..., WSz) with their weight factors and then adding the bias of the neuron 1123. The formula for this calculation is shown as equation (2) below.

$$NWSy=(WS1)(W1y+(WS2)(W2y)+(WS3)(W3y)+(WS4)(W4y), \ldots, (WSz)(Wzy)+b2y \quad (2)$$

where NWSy is the weighted sum of neuron Y, where Y is from 1 (for the 1$^{st}$ neuron 1123) to the number of neurons 1123 in the second layer of the hidden layers 1103. WS1, WS2, etc. are the weighted sums from the neurons 1113 and W1y, W2y, etc. are the weight values applied to the connections to the neuron Y from the neurons 1113 and b2y is the bias value of neuron Y. This next weighted sum NWSy is input to an activation function (e.g., in this case ReLu) to compute the value of the activation function for each neuron 1123. The next weighted sum values of all neurons 1123 in the second layer are calculated in accordance with equation (2).

In illustrative embodiments, each neuron 1114 computes a final weighted sum (FWS) by adding the products of each next weighted sum from the neurons 1123 (NWS1, NWS2, ..., NWSy) with their weight factors and then adding the bias of the neuron 1114. The formula for this calculation is shown as equation (3) below.

$$FWSp=(NWS1)(W1p)+(NWS2)(W2p), \ldots, (NWSy)(Wyp)+b3p \quad (3)$$

where FWSp is the weighted sum of neuron P, where P is from 1 (for the 1$^{st}$ neuron 1114) to the number of neurons 1114 in the output layer 1104. NWS1, NWS2, etc. are the next weighted sums from the neurons 1123 and W1p, W2p, etc. are the weight values applied to the connections to the neuron P from the neurons 1123 and b3p is the bias value of neuron P. This final weighted sum FWSp is input to an activation function (e.g., in this case Softmax) to compute the value of the activation function for each neuron 1114. The final weighted sum values of all neurons 1114 in the output layer 1104 are calculated in accordance with equation (3).

The final weighted sum values are compared to target values. Depending upon the difference from the target values, loss values are calculated. The pass through of the neural network 1100 is a forward propagation, which calculates error and drives a backpropagation through the neural network 1100 to minimize the loss (e.g., error) at each neuron 1112, 1113, 1123 and 1114 of the neural network 1100. Considering loss may be generated by all the neurons 1112, 1113, 1123 and 1114 in the neural network 1100, a backpropagation process goes through each layer from the output layer 1104 to the input layer 1102 and attempts to minimize the loss by using a gradient descent-based optimization mechanism. Considering the neural network 1100 is used in illustrative embodiments as a regressor, illustrative embodiments use a loss function as "categorical_crossentropy", adam (adaptive moment estimation) as an optimization algorithm, and metrics values as "accuracy".

The result of the backpropagation processing is to adjust the weight and/or bias values corresponding to one or more connections and/or neurons 1112, 1113, 1123 and 1114 in order to reduce loss. Once all the observations of the training data are passed through the neural network 1100, an epoch is completed. Another forward propagation is initiated with the adjusted weight and bias values, which is considered as epoch2. The same process of forward and backpropagation is repeated in subsequent epochs. This process of repeating the epochs results in the reduction of loss to a relatively small number (e.g., close to 0), at which point the neural network 1100 is considered to be sufficiently trained for prediction.

Given a particular situation, query and/or input, the psychometric analysis engine 150 uses one or more machine learning techniques to automatically recommend personalized training and/or types or content of individual assessments for a user based on the psychometric classification(s) by the classification component 152. The psychometric classifications made by the classification component 152 are driven by the information in the individual data repository 140, including relationship information in relationship graphs and the intent and sentiments identified by the intent and sentiment classification components 133 and 134 of the context analysis engine 130. The recommendations are automatically generated for a specific user based on learned behavior of that particular user. The individual profile development platform 110 may perform other automated actions based on the classification including, but not necessarily limited to, automatically generating and transmitting training programs and/or psychometric trait assessments to users via user devices 102, automatically generating and transmitting alerts and/or notifications regarding psychometric classifications and/or recommended actions based on the psychometric classifications to one of the user devices 102, and/or automatically uploading code, firmware, upgrades and/or other applications and software to the user device 102 to implement recommended training programs and/or psychometric trait assessments.

According to one or more embodiments, one or more of the databases (graph database 143, supplemental training data database 155), knowledge bases (e.g., knowledge base 206), repositories (e.g., individual data repository 140) and/or corpuses (e.g., corpuses 473, 663 and 863) used by the individual profile development platform 110 can be configured according to a relational database management system (RDBMS) (e.g., PostgreSQL). Databases, knowledge bases, repositories and/or corpuses in some embodiments are implemented using one or more storage systems or devices associated with the individual profile development platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the individual profile development platform 110, the communication interface engine 120, the context analysis engine 130, the individual data repository 140, the psychometric analysis engine 150 and the supplemental training data database 155 in other embodiments can be implemented at least in part externally to the individual profile development platform 110, for example, as stand-alone servers, sets of servers or other types of systems coupled to the network 104. For example, the communication interface engine 120, the context analysis engine 130, the individual data repository 140, the psychometric analysis engine 150 and the supplemental training data database 155 may be provided as cloud services accessible by the individual profile development platform 110.

The communication interface engine 120, the context analysis engine 130, the individual data repository 140, the psychometric analysis engine 150 and the supplemental training data database 155 in the FIG. 1 embodiment are each assumed to be implemented using at least one processing device. Each such processing device generally comprises at least one processor and an associated memory, and implements one or more functional modules for controlling certain features of the communication interface engine 120, the context analysis engine 130, the individual data repository 140, the psychometric analysis engine 150 and/or the supplemental training data database 155.

At least portions of the individual profile development platform 110 and the components thereof may be implemented at least in part in the form of software that is stored in memory and executed by a processor. The individual profile development platform 110 and the components thereof comprise further hardware and software required for running the individual profile development platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the communication interface engine 120, the context analysis engine 130, the individual data repository 140, the psychometric analysis engine 150, the supplemental training data database 155 and other components of the individual profile development platform 110 in the present embodiment are shown as part of the individual profile development platform 110, at least a portion of the communication interface engine 120, the context analysis engine 130, the individual data repository 140, the psychometric analysis engine 150, the supplemental training data database 155 and other components of the individual profile development platform 110 in other embodiments may be implemented on one or more other processing platforms that are accessible to the individual profile development platform 110 over one or more networks. Such components can each be implemented at least in part within another system element or at least in part utilizing one or more stand-alone components coupled to the network 104.

It is assumed that the individual profile development platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the communication interface engine 120, the context analysis engine 130, the individual data repository 140, the psychometric analysis engine 150, the supplemental training data database 155 and other components of the individual profile development platform 110, and the elements thereof can each be implemented in the form of one or more LXCs running on one or more VMs. Other arrangements of one or more processing devices of a processing platform can be used to implement the communication interface engine 120, the context analysis engine 130, the individual data repository 140, the psychometric analysis engine 150 and the supplemental training data database 155, as well as other components of the individual profile development platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the individual profile development platform 110 to reside in different data centers. Numerous other distributed implementations of the individual profile development platform 110 are possible.

Accordingly, one or each of the communication interface engine 120, the context analysis engine 130, the individual data repository 140, the psychometric analysis engine 150, the supplemental training data database 155 and other components of the individual profile development platform 110 can each be implemented in a distributed manner so as to comprise a plurality of distributed components implemented on respective ones of a plurality of compute nodes of the individual profile development platform 110.

It is to be appreciated that these and other features of illustrative embodiments are presented by way of example only, and should not be construed as limiting in any way.

Accordingly, different numbers, types and arrangements of system components such as the communication interface engine 120, the context analysis engine 130, the individual data repository 140, the psychometric analysis engine 150, the supplemental training data database 155 and other components of the individual profile development platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the individual profile development platform can be offered to cloud infrastructure customers or other users as part of FaaS, CaaS and/or PaaS offerings.

Figure 12:
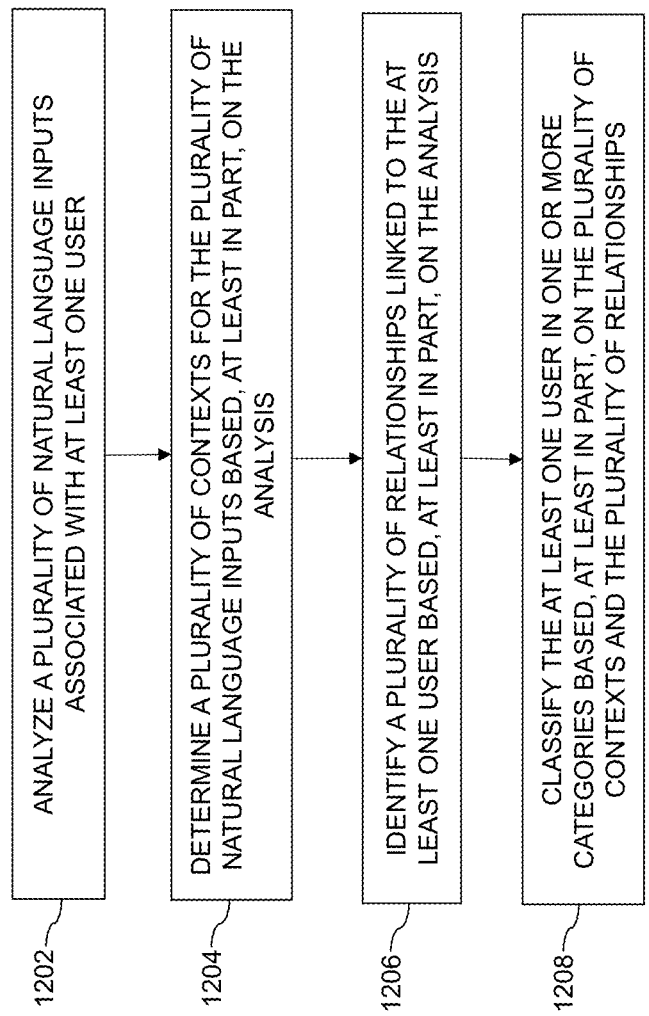
FIG. 12 depicts a process for classifying individuals based on one or more features according to an illustrative embodiment.

The operation of the information processing system 100 will now be described in further detail with reference to the flow diagram of FIG. 12. With reference to FIG. 12, a process 1200 for classifying individuals based on one or more features as shown includes steps 1202 through 1208, and is suitable for use in the system 100 but is more generally applicable to other types of information processing systems comprising an individual profile development platform configured for classifying individuals based on one or more features.

In step 1202, a plurality of natural language inputs associated with at least one user are analyzed. Analyzing the plurality of natural language inputs comprises performing at least one of NLP on and NLU of a plurality of communications associated with the at least one user. One or more of the plurality of natural language inputs is in a speech format. A convolutional neural network is used to convert the one or more of the plurality of natural language inputs from the speech format to a text format.

In step 1204, a plurality of contexts for the plurality of natural language inputs are determined based, at least in part, on the analysis. In step 1206, a plurality of relationships linked to the at least one user are identified based, at least in part, on the analysis. One or more relationship graphs comprising the plurality of relationships are generated. The one or more relationship graphs include the plurality of relationships between a plurality of nodes, wherein the plurality of relationships comprise edges of the one or more relationship graphs. The plurality of nodes comprise at least one of one or more persons, one or more domains, one or more sub-domains, one or more functions, one or more utilities and one or more activities. The relationships comprise interactions between respective pairs of the plurality of nodes. The one or more relationship graphs are in one of an RDF format and an LPG format.

In step 1208, the at least one user is classified in one or more categories based, at least in part, on the plurality of contexts and the plurality of relationships. At least one of the analyzing, determining, identifying and classifying is performed using one or more machine learning models. The one or more categories comprise one or more psychometric classes. The plurality of contexts comprise a plurality of intents and/or a plurality of sentiments for the plurality of natural language inputs, and wherein the plurality of intents and sentiments are determined using a bi-directional recurrent neural network.

A plurality of features are extracted from the plurality of contexts and from the one or more relationship graphs. Classifying the at least one user in one or more categories comprises inputting the plurality of features to a neural network which predicts the one or more categories for the at least one user. The neural network is trained with context data and relationship data. The neural network comprises at least two hidden layers utilizing a rectified linear unit activation function, and comprises a plurality of nodes connected with each other. Respective ones of the connections comprise a weight factor and respective ones of the plurality of nodes comprise a bias factor.

It is to be appreciated that the FIG. 12 process and other features and functionality described above can be adapted for use with other types of information systems configured to execute individual profile development services in an individual profile development platform or other type of platform.

The particular processing operations and other system functionality described in conjunction with the flow diagram of FIG. 12 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 12 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an individual profile development platform as disclosed herein can provide a number of significant advantages relative to conventional arrangements. For example, unlike conventional techniques, the embodiments advantageously use machine learning techniques to analyze incoming natural language inputs to identify contexts of user communications and identify user relationships. The embodiments provide for multi-lingual and multi-mode (e.g., text-to-text, text-to-speech, speech-to-text, and speech-to-speech) communication.

The embodiments provide technical solutions with functionality for maintaining and managing user-specific data and classifying psychometric attributes of a user. Advantageously, the embodiments combine select machine learning techniques to provide a framework that collects individual communications in various channels including email, chat, voice, meeting transcripts, etc. and builds a psychometric profile of individuals in an enterprise. This dynamic personalization facilitates understanding and analysis of many attributes including, but not limited to, individual satisfaction, leadership, sentiments, etc., thus enabling individualized and targeted relationships. The personalized individual engagement system continuously learns and builds expertise about individuals (e.g., employees of an enterprise) by shadowing the individual in various mediums (e.g., virtually through emails, meetings, audio and video conferences, etc.) and using machine learning to classify users and recommend tailored feedback and training to increase individual productivity, loyalty and satisfaction.

The individual profile development platform builds an individual data repository based on relationships of users with individuals, utilities, tasks, activities and subject areas in ecosystems in which the users operate. The repository provides machine learning models with data to enable psychometric classification of the individuals, and automated actions based on the classification. Classification is based on the relationship data from the repository and context determinations of natural language inputs. For example, as an additional advantage, the embodiments combine NLP, NLU and other linguistic analysis using stemming and lemmatization to identify the context of natural language inputs to perform intent and sentiment analysis to identify the intent of communications, as well as positive, negative or neutral emotional intensity of words, phrases, symbols, punctuation, and emojis.

Unlike conventional approaches, virtual agents in a communication interface engine capture and/or intercept conversations from various communication channels. The embodiments leverage NLP to perform intent analysis, sentiment analysis and topic building, and to build relationship graphs based on the data from the various communication channels. The embodiments create an individual data repository including the results of the intent analysis, sentiment analysis, topic building, and relationship graph generation. Utilizing machine learning classifiers, a psychometric analysis engine uses the data from the individual data repository to classify each individual into one or more psychometric classes corresponding to metrics such as, for example, interests, goals, loyalty, satisfaction, leadership and other personal traits.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the individual profile development platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an individual profile development platform in illustrative embodiments. These and other cloud-based systems in illustrative embodiments can include object stores.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
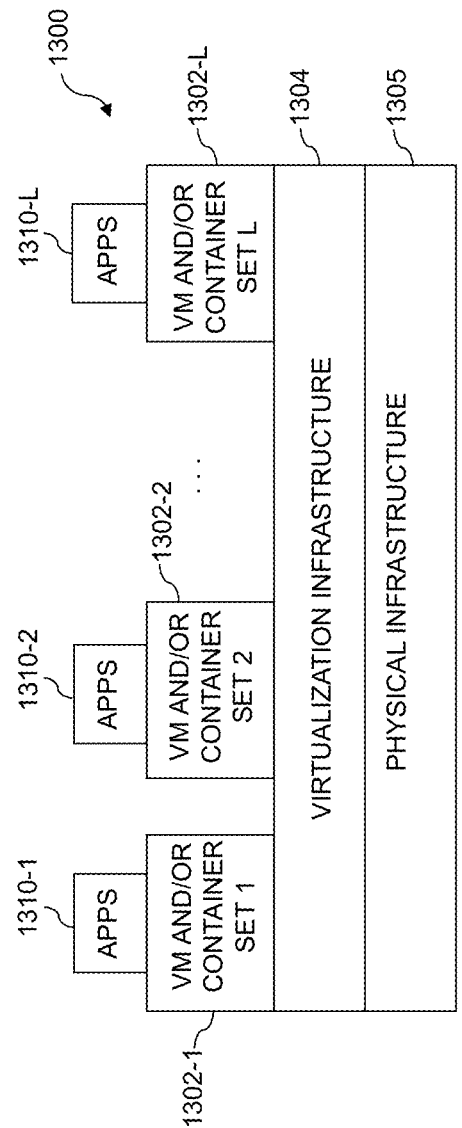
FIGS. 13 and 14 show examples of processing platforms that may be utilized to implement at least a portion of an information processing system according to illustrative embodiments.
Figure 14:
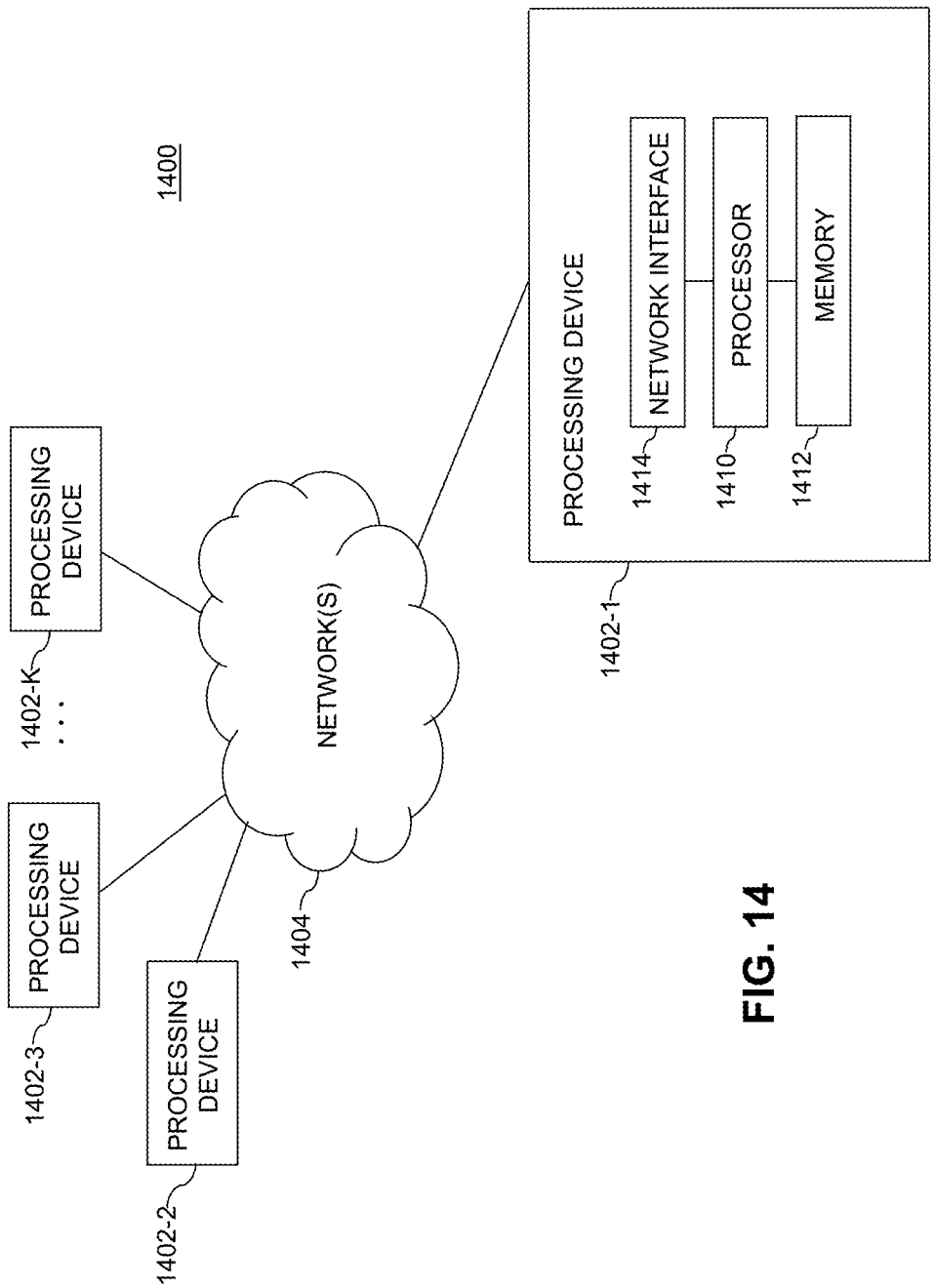

FIG. 13 shows an example processing platform comprising cloud infrastructure 1300. The cloud infrastructure 1300 comprises a combination of physical and virtual processing resources that may be utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412. The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the individual profile development platform 110 as disclosed herein are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems and individual profile development platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    capturing, using one or more virtual agents, a plurality of communications associated with at least one user;
    generating a plurality of natural language inputs based on the plurality of communications associated with the at least one user using one or more machine learning algorithms;
    analyzing the plurality of natural language inputs associated with the at least one user using the one or more machine learning algorithms, the analyzing comprising:
        determining a plurality of contexts for the plurality of natural language inputs based on one or more natural language processing algorithms of the one or more machine learning algorithms;
        identifying a plurality of relationships linked to the at least one user based on one or more other users associated with the plurality of communications, and one or more domains in which the plurality of communications occurred;
    generating a corpus associated with the at least one user comprising intent corpus data and sentiment corpus data based on the determined plurality of contexts, words and phrases associated with the plurality of natural language inputs, and relationship corpus data based on the identified plurality of relationships;
    training a first machine learning model using the of the intent corpus data of the generated corpus associated with the at least one user, the input corpus data comprising intents corresponding to the words and phrases associated with the plurality of natural language inputs based on the plurality of communications associated with the at least one user;
    training a second machine learning model using the of the sentiment corpus data of the generated corpus associated with the at least one user, the sentiment corpus data comprising sentiments corresponding to the words and phrases associated with the plurality of natural language inputs based on the plurality of communications associated with the at least one user;
    training a third machine learning model using the of the relationship corpus data of the generated corpus associated with the at least one user, the relationship corpus data comprising interactions between the at least one user and the one or more other users associated with the plurality of communications, one or more actions taken by the at least one user and the one or more other users in the interactions, and domains of the one or more domains in which the interactions and actions occurred, based on the identified plurality of relationships linked to the at least one user;

predicting, with the trained first machine learning model, a plurality of intents for a plurality of incoming communications associated with the at least one user;
predicting, with the trained second machine learning model, a plurality of sentiments for the plurality of incoming communications associated with the at least one user and a priority for the plurality of incoming communications associated with the at least one user based on the plurality of sentiments;
generating, with the trained third machine learning model, one or more relationship graphs associated with the identified plurality of relationships linked to the at least one user in the plurality of incoming communications;
saving the plurality of intents, plurality of sentiments and the one or more relationship graphs to an individual profile associated with the at least one user;
training a fourth machine learning model using the plurality of intents, the plurality of sentiments, and the one or more relationship graphs of the individual profile associated with the at least one user;
classifying the at least one user, using the trained fourth machine learning model, in one or more categories based, at least in part, on the plurality of intents, the plurality of sentiments, and the one or more relationship graphs of the individual profile associated with the at least one user;
generating one or more recommendations for the at least one user based on the classification of the at least one user into the one or more categories, using the fourth machine learning model; and
iteratively updating the individual profile associated with the at least one user by:
 inputting one or more additional communications associated with the at least one user into the first, second and third machine learning models to generate an updated plurality of intents, an updated plurality of sentiments, and an updated one or more relationship graphs;
 updating the individual profile associated with the at least one user with the updated plurality of intents, the updated plurality of sentiments, and the updated one or more relationship graphs;
 inputting the updated plurality of intents, the updated plurality of sentiments, and the updated one or more relationship graphs of the updated individual profile associated with the at least one user into the fourth machine learning model to adjust the fourth machine learning model;
 re-classifying the at least one user into the one or more categories with the adjusted fourth machine learning model based, at least in part, on the updated plurality of sentiments, and the updated one or more relationship graphs of the updated individual profile associated with the at least one user; and
 generating one or more additional recommendations for the at least one user based on the classification of the at least one user into the one or more categories;
wherein the steps of the method are executed by a processing device operatively coupled to a memory.

2. The method of claim 1, wherein the first machine learning model comprises a bi-directional recurrent neural network.

3. The method of claim 1, wherein the second machine learning model comprises a bi-directional recurrent neural network.

4. The method of claim 1, wherein the one or more relationship graphs include the plurality of relationships modeled by a plurality of nodes, wherein the plurality of relationships between the plurality of nodes comprise edges of the one or more relationship graphs.

5. The method of claim 4, wherein the plurality of nodes comprise at least one of one or more persons, the one or more domains, one or more sub-domains, one or more functions, one or more utilities and one or more activities.

6. The method of claim 4, wherein the relationships between the plurality of nodes comprise interactions between respective pairs of the plurality of nodes.

7. The method of claim 4, wherein the one or more relationship graphs are in one of a resource description framework (RDF) format and a labeled property graph (LPG) format.

8. The method of claim 4, further comprising extracting a plurality of features from the plurality of intents, the plurality of sentiments and from the one or more relationship graphs, wherein classifying the at least one user into the one or more categories comprises inputting the plurality of features to a neural network of the fourth machine learning model which predicts the one or more categories for the at least one user.

9. The method of claim 8, further comprising training the neural network of the fourth machine learning model with context data and relationship data.

10. The method of claim 8, wherein the neural network of the fourth machine learning model comprises at least two hidden layers utilizing a rectified linear unit activation function.

11. The method of claim 8, wherein the neural network of the fourth machine learning model comprises a plurality of nodes connected with each other, wherein respective ones of connections comprise a weight factor and respective ones of the plurality of nodes comprise a bias factor.

12. The method of claim 1, wherein analyzing the plurality of natural language inputs comprises performing at least one of natural language processing on and natural language understanding of the plurality of communications associated with the at least one user.

13. The method of claim 1, wherein one or more of the plurality of natural language inputs is in a speech format and the method further comprises using a convolutional neural network to convert the one or more of the plurality of natural language inputs from the speech format to a text format.

14. The method of claim 1, wherein the one or more categories comprise one or more psychometric classes.

15. An apparatus, comprising:
a processing device operatively coupled to a memory and configured to:
 capture, using one or more virtual agents, a plurality of communications associated with at least one user;
 generate a plurality of natural language inputs based on the plurality of communications associated with the at least one user using one or more machine learning algorithms;
 analyze the plurality of natural language inputs associated with the at least one user using the one or more machine learning algorithms, the analyzing comprising:
  determine a plurality of contexts for the plurality of natural language inputs based, on one or more natural language processing algorithms of the one or more machine learning algorithms;
  identify a plurality of relationships linked to the at least one user based on one or more other users associated with the plurality of communications and one or more domains in which the plurality of communications occurred;

generate a corpus associated with the at least one user comprising intent corpus data and sentiment corpus data based on the determined plurality of contexts, words and phrases associated with the plurality of natural language inputs, and relationship corpus data based on the identified plurality of relationships;

train a first machine learning model using the of the intent corpus data of the generated corpus associated with the at least one user, the input corpus data comprising intents corresponding to the words and phrases associated with the plurality of natural language inputs based on the plurality of communications associated with the at least one user;

train a second machine learning model using the of the sentiment corpus data of the generated corpus associated with the at least one user, the sentiment corpus data comprising sentiments corresponding to the words and phrases associated with the plurality of natural language inputs based on the plurality of communications associated with the at least one user;

train a third machine learning model using the of the relationship corpus data of the generated corpus associated with the at least one user, the relationship corpus data comprising interactions between the at least one user and the one or more other users associated with the plurality of communications, one or more actions taken by the at least one user and the one or more other users in the interactions, and domains of the one or more domains in which the interactions and actions occurred, based on the identified plurality of relationships linked to the at least one user;

predict, with the trained first machine learning model, a plurality of intents for a plurality of incoming communications associated with the at least one user;

predict, with the trained second machine learning model, a plurality of sentiments for the plurality of incoming communications associated with the at least one user and a priority for the plurality of incoming communications associated with the at least one user based on the plurality of sentiments;

generate, with the trained third machine learning model, one or more relationship graphs associated with the identified plurality of relationships linked to the at least one user in the plurality of incoming communications;

save the plurality of intents, plurality of sentiments and the one or more relationship graphs to an individual profile associated with the at least one user;

train a fourth machine learning model using the plurality of intents, the plurality of sentiments, and the one or more relationship graphs of the individual profile associated with the at least one user;

classify the at least one user, using the trained fourth machine learning model, in one or more categories based, at least in part, on the plurality of intents, the plurality of sentiments, and the one or more relationship graphs of the individual profile associated with the at least one user;

generate one or more recommendations for the at least one user based on the classification of the at least one user into the one or more categories, using the fourth machine learning model; and iteratively update the individual profile associated with the at least one user by:
inputting one or more additional communications associated with the at least one user into the first, second and third machine learning models to generate an updated plurality of intents, an updated plurality of sentiments, and an updated one or more relationship graphs;
updating the individual profile associated with the at least one user with the updated plurality of intents, the updated plurality of sentiments, and the updated one or more relationship graphs;
inputting the updated plurality of intents, the updated plurality of sentiments, and the updated one or more relationship graphs of the updated individual profile associated with the at least one user into the fourth machine learning model to adjust the fourth machine learning model;
re-classifying the at least one user into the one or more categories with the adjusted fourth machine learning model based, at least in part, on the updated plurality of sentiments, and the updated one or more relationship graphs of the updated individual profile associated with the at least one user; and
generating one or more additional recommendations for the at least one user based on the classification of the at least one user into the one or more categories.

16. The apparatus of claim 15 wherein the one or more relationship graphs include the plurality of relationships modeled by a plurality of nodes, wherein the plurality of relationships between the plurality of nodes comprise edges of the one or more relationship graphs.

17. The apparatus of claim 16, wherein the processing device is further configured to extract a plurality of features from the plurality of intents, the plurality of sentiments and from the one or more relationship graphs, and wherein, in classifying the at least one user into the one or more categories, the processing device is configured to input the plurality of features to a neural network of the fourth machine learning model which predicts the one or more categories for the at least one user.

18. An article of manufacture comprising a non-transitory processor-readable storage medium having stored therein program code of one or more software programs, wherein the program code when executed by at least one processing device causes said at least one processing device to perform the steps of:

capturing, using one or more virtual agents, a plurality of communications associated with at least one user;

generating a plurality of natural language inputs based on the plurality of communications associated with the at least one user using one or more machine learning algorithms;

analyzing the plurality of natural language inputs associated with the at least one user using the one or more machine learning algorithms, the analyzing comprising:
determining a plurality of contexts for the plurality of natural language inputs based on one or more natural language processing algorithms of the one or more machine learning algorithms;
identifying a plurality of relationships linked to the at least one user based on one or more other users associated with the plurality of communications and one or more domains in which the plurality of communications occurred;

generating a corpus associated with the at least one user comprising intent corpus data and sentiment corpus data based on the determined plurality of contexts, words and phrases associated with the plurality of natural language inputs, and relationship corpus data based on the identified plurality of relationships;

training a first machine learning model using the of the intent corpus data of the generated corpus associated with the at least one user, the input corpus data comprising intents corresponding to the words and phrases associated with the plurality of natural language inputs based on the plurality of communications associated with the at least one user;

training a second machine learning model using the of the sentiment corpus data of the generated corpus associated with the at least one user, the sentiment corpus data comprising sentiments corresponding to the words and phrases associated with the plurality of natural language inputs based on the plurality of communications associated with the at least one user;

training a third machine learning model using the of the relationship corpus data of the generated corpus associated with the at least one user, the relationship corpus data comprising interactions between the at least one user and the one or more other users associated with the plurality of communications, one or more actions taken by the at least one user and the one or more other users in the interactions, and domains of the one or more domains in which the interactions and actions occurred, based on the identified plurality of relationships linked to the at least one user;

predicting, with the trained first machine learning model, a plurality of intents for a plurality of incoming communications associated with the at least one user;

predicting, with the trained second machine learning model, a plurality of sentiments for the plurality of incoming communications associated with the at least one user and a priority for the plurality of incoming communications associated with the at least one user based on the plurality of sentiments;

generating, with the trained third machine learning model, one or more relationship graphs associated with the identified plurality of relationships linked to the at least one user in the plurality of incoming communications;

saving the plurality of intents, plurality of sentiments and the one or more relationship graphs to an individual profile associated with the at least one user;

training a fourth machine learning model using the plurality of intents, the plurality of sentiments, and the one or more relationship graphs of the individual profile associated with the at least one user;

classifying the at least one user, using the trained fourth machine learning model, in one or more categories based, at least in part, on the plurality of intents, the plurality of sentiments, and the one or more relationship graphs of the individual profile associated with the at least one user;

generating one or more recommendations for the at least one user based on the classification of the at least one user into the one or more categories, using the fourth machine learning model; and iteratively updating the individual profile associated with the at least one user by:

inputting one or more additional communications associated with the at least one user into the first, second and third machine learning models to generate an updated plurality of intents, an updated plurality of sentiments, and an updated one or more relationship graphs;

updating the individual profile associated with the at least one user with the updated plurality of intents, the updated plurality of sentiments, and the updated one or more relationship graphs;

inputting the updated plurality of intents, the updated plurality of sentiments, and the updated one or more relationship graphs of the updated individual profile associated with the at least one user into the fourth machine learning model to adjust the fourth machine learning model;

re-classifying the at least one user into the one or more categories with the adjusted fourth machine learning model based, at least in part, on the updated plurality of sentiments, and the updated one or more relationship graphs of the updated individual profile associated with the at least one user; and generating one or more additional recommendations for the at least one user based on the classification of the at least one user into the one or more categories.

19. The article of manufacture of claim 18 wherein the one or more relationship graphs include the plurality of relationships modeled by a plurality of nodes, wherein the plurality of relationships between the plurality of nodes comprise edges of the one or more relationship graphs.

20. The article of manufacture of claim 19 wherein the program code further causes said at least one processing device to perform the step of extracting a plurality of features from the plurality of intents, the plurality of sentiments and from the one or more relationship graphs, and wherein, in classifying the at least one user into the one or more categories, the program code further causes said at least one processing device to perform the step of inputting the plurality of features to a neural network of the fourth machine learning model which predicts the one or more categories for the at least one user.

* * * * *